United States Patent [19]

Kappler

[11] 3,972,358

[45] Aug. 3, 1976

[54] APPARATUS FOR DELIMBING TREES

[76] Inventor: Gilbert O. Kappler, 28330 S. Highway 213, Mulino, Oreg. 97042

[22] Filed: July 11, 1975

[21] Appl. No.: 595,075

[52] U.S. Cl. .............................. 144/3 R; 144/2 Z; 144/309 AC; 144/242 D; 198/20 R; 198/31 AB; 214/1 P
[51] Int. Cl.² .................... A01G 23/08; B65G 47/00
[58] Field of Search ......... 214/1 P; 198/34 R, 31 R, 198/31 AB, 20 R; 144/2 Z, 3 D, 309 AC, 242 R, 242 D, 242 E, 3 R, 1 R, 2 R, 309 R

[56] References Cited
UNITED STATES PATENTS

| | | | |
|---|---|---|---|
| 3,457,975 | 7/1969 | Wher et al. | 144/2 Z |
| 3,643,708 | 2/1972 | Lindblom | 144/2 Z |
| 3,653,417 | 4/1972 | Cervenak | 144/2 Z X |
| 3,812,951 | 5/1974 | Fullaway | 214/1 P |

Primary Examiner—Othell M. Simpson
Assistant Examiner—W. D. Bray
Attorney, Agent, or Firm—Kolisch, Hartwell, Dickinson & Stuart

[57] ABSTRACT

Apparatus for delimbing felled trees including an elongate support along which a tree may be carried longitudinally through the apparatus. The support is foldable for shortening for transport. Powered driving means are operable to draw a tree through the apparatus and flexible shearing cutters are positioned to be wrapped about a tree to shear limbs therefrom as it is drawn through the apparatus. The limbs sheared from the tree are fed into a chipper which reduces them to chips. Side shifting conveyors downstream from the cutters are operable to deposit a tree to one side of the support after it has been delimbed.

27 Claims, 8 Drawing Figures

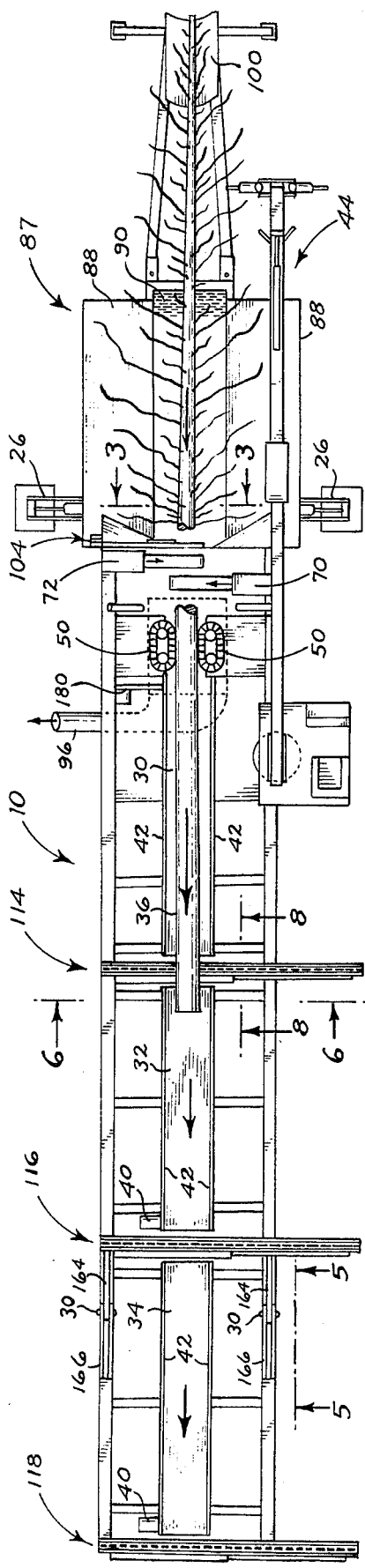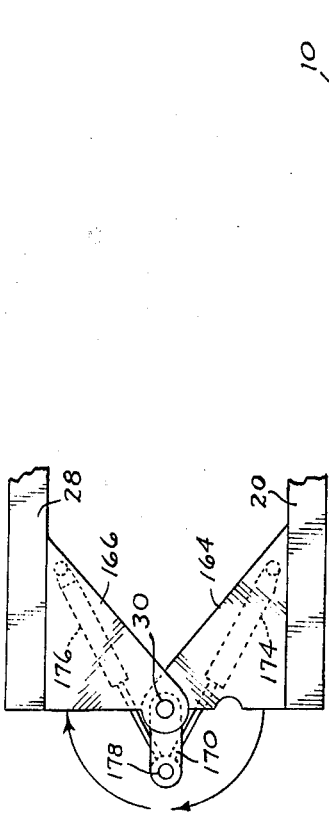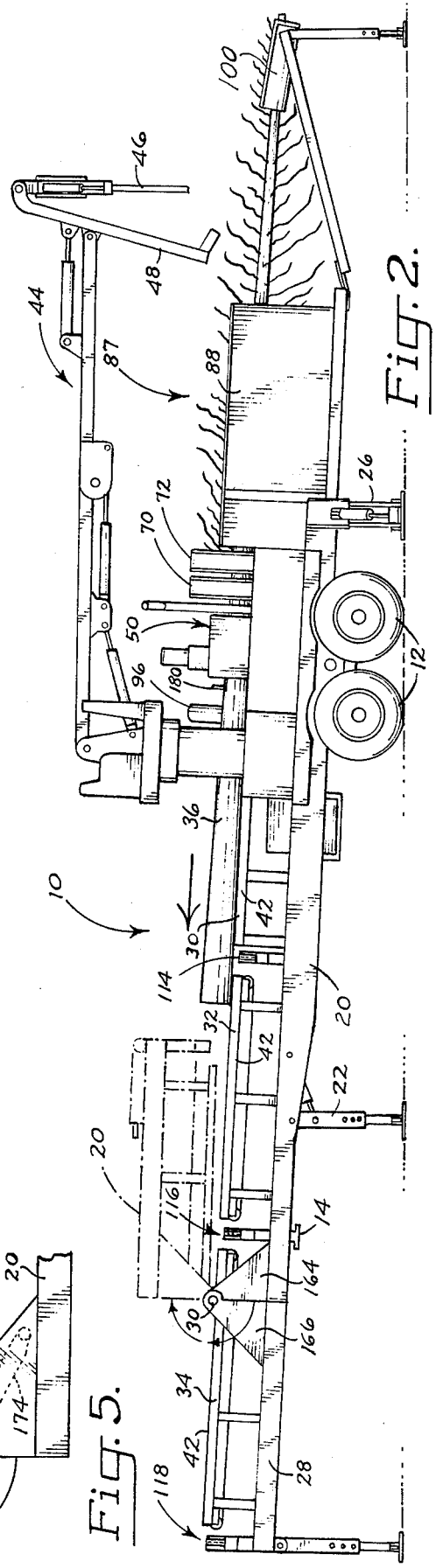

APPARATUS FOR DELIMBING TREES

BACKGROUND AND SUMMARY OF THE INVENTION

This invention relates to apparatus for delimbing felled trees, and more particularly to such apparatus in which limbs sheared from the tree are reduced to chips and the delimbed trees are stacked to one side of the apparatus.

Felled trees generally must be delimbed prior to loading for transportation and for other reasons. Such delimbing generally in the past has been done manually, with a workman using a hand-held power saw moving along the tree lying on the ground and cutting individual limbs from the tree. Not only is this dangerous for the workman, in that he is in a position to be injured, but it also produces loosely lying limbs which then must be gathered and piled. Such limbs further create a problem in that they then must be either reduced to chips by feeding to a chipping device, or burned, which often is prohibited because of fire hazards or air pollution standards.

Attempts have been made in the past to develop apparatus which will mechanically delimb a tree and take care of the other problems set out above. Such prior attempts, however, have not been altogether successful, as is evidenced by the continued manual removal of limbs, with the attendant stacking of limbs, problems of removal of the limbs from the site, and dangers to workmen.

A general object of the present invention is to provide novel apparatus for mechanically delimbing trees rapidly and efficiently and thereby overcome the problems set out above attendant in prior manual and previously designed delimbing operations.

More specifically, an object of the invention is to provide novel apparatus for delimbing felled trees which supports a tree for movement longitudinally through the apparatus, and includes powered driving means for moving a tree under power longitudinally therethrough and shearing means for shearing limbs from the tree as it is drawn through the apparatus. Chipper means beneath the shearing means is operable to reduce the limbs removed from the tree to chips which then are blown into a pile or into awaiting trucks for transportation. Side shifter means downstream from the shearing means is operable to deposit a delimbed tree on a stack or on waiting log bunks or log truck beds as desired.

Such apparatus, therefore, is operable to eliminate burning of debris by reducing the removed limbs to chips, or hog material which may be used for other purposes.

Further, the novel apparatus of the invention eliminates the need for manual delimbing, gathering and piling of removed limbs, and other manual steps which previously have been required.

Yet another object of the invention is to provide novel means for cutting off the top end of a tree under a preselected minimum diameter as it is carried through the delimbing apparatus and dropping the top of the tree into the chipper means along with the removed limbs for reduction to chips.

A still further object of the present invention is to provide novel apparatus for delimbing felled trees which includes a support platform mounted on wheels, which platform has sufficient length for handling desired lengths of trees, yet which has a pivoted forward section which may be swung up and over and laid atop a rear section of the platform to shorten the same for transportation.

DRAWINGS

These and other objects and advantages will become more fully apparent as the following description is read in conjunction with the drawings, wherein:

FIG. 1 is a top plan view of apparatus constructed according to an embodiment of the invention;

FIG. 2 is a side elevation view of the apparatus of FIG. 1;

FIG. 5 is an enlarged view taken along the line 5—5 of a pivot connection and actuator means between foldable front and rear sections of the apparatus, and illustrating them in a position in which one section of the support platform is folded back and over the other section;

DESCRIPTION OF PREFERRED EMBODIMENT OF THE INVENTION

Figures 3, 4:
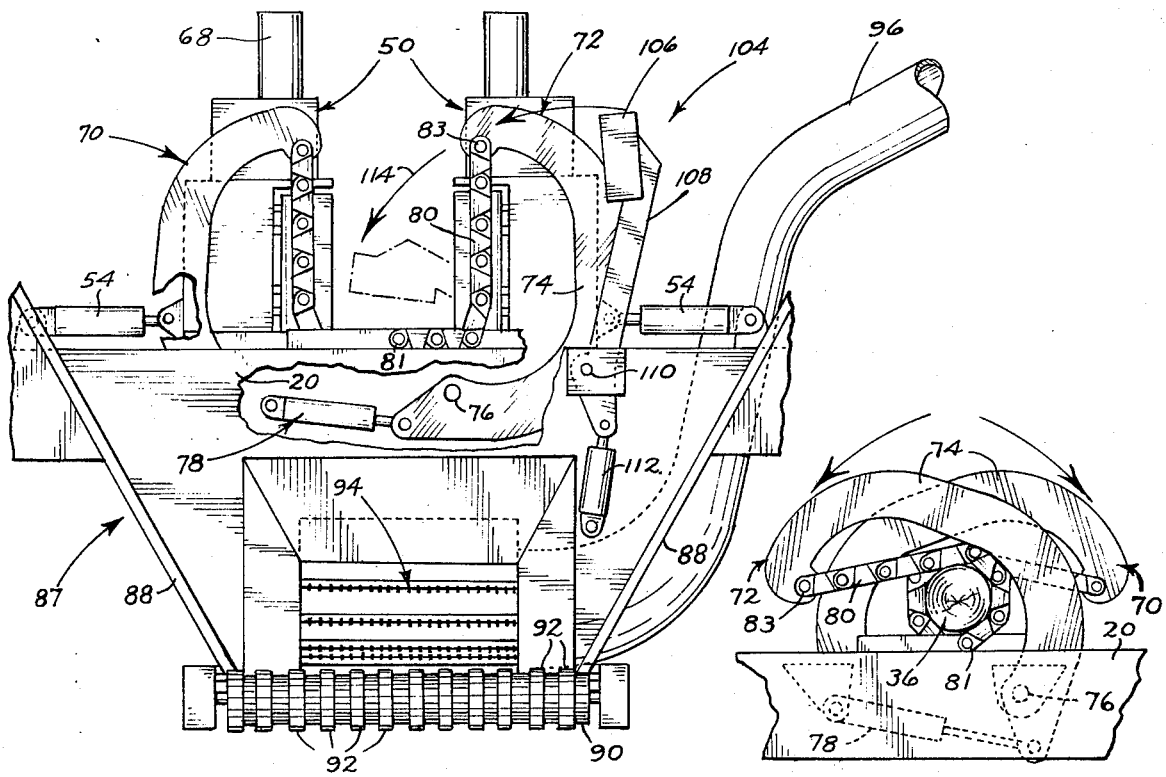
FIG. 3 is an enlarged view taken generally along the line 3—3 in FIG. 1 illustrating the infeed to a chipper and a pair of opposed cutters illustrated in upright, tree receiving positions.
FIG. 4 is a view similar to FIG. 3, but illustrating the cutters laid over to grip a log therebetween.

Referring to the drawings, and first more specifically to FIGS. 1 and 2, at 10 is indicated generally apparatus constructed according to an embodiment of the invention. The apparatus is illustrated mounted on wheels 12 and having a connector 14 adjacent its forward end for connecting to a towing vehicle whereby the same is portable and may be transported between various work locations. An elongate rear base platform, or support section, 20 is supported adjacent its rear end on wheels 12 and has an extensible support 22 adjacent its forward end for supporting it in a work position. Hydraulically actuated outriggers 26 adjacent the rear end of platform 20 solidly engage the ground to stabilize the apparatus during operation.

An elongate forward section 28 of the apparatus is pivotally connected through pivot pins 30 to the forward end of section 20 for swinging about a substantially horizontal pivot axis relative to section 20. Section 28 is illustrated in solid outline in FIGS. 1 and 2 in its operating position, extending axially forwardly from section 20. It is illustrated in dot-dashed outline in FIG. 2 and in solid outline in FIG. 8 folded back and over section 20 in a stored, or transport, position. In this manner the apparatus may be shortened for transport.

Supported on sections 20, 28 are elongate, axially aligned, tree supports 30, 32, 34. Support 30 is a stationary flat bed along which a tree, such as that illustrated at 36, may be slid longitudinally in the direction of the arrows, to the left in FIGS. 1 and 2.

Supports 32, 34 are elongate, endless, conveyor belts driven by motors 40 for aiding in carrying the tree in the desired downstream direction in the apparatus. Guide members 42 extending along opposite edges of and projecting slightly above the upper surfaces of supports 30, 32, 34 aid in maintaining the tree on the supports. As is seen, spaces are provided between adjacent ends of supports 30, 32 and 34, the purpose for which will be discussed below.

A power-operated crane 44 having a power-actuated grapple, or tongs, 46 and a live heel boom 48 is operable to pick up logs adjacent the rear end of the apparatus and place them, butt end first, in the apparatus, as will be explained below.

Figure 7:
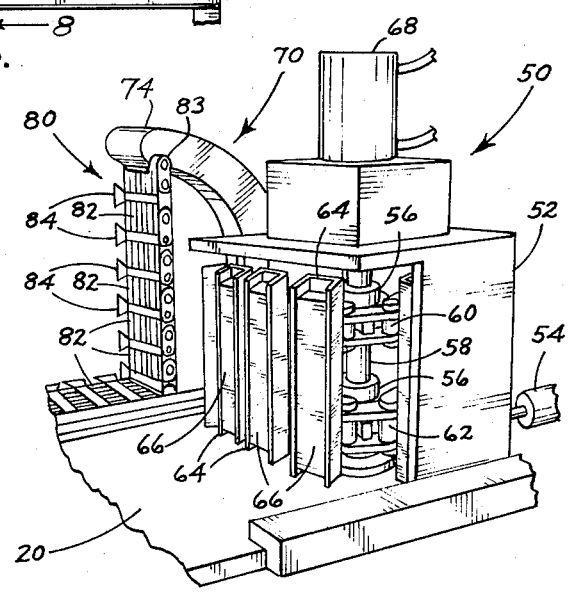
FIG. 7 is an enlarged perspective view of tree driving means in the apparatus.

Referring to FIGS. 1, 3 and 7, at 50 are indicated a pair of laterally spaced, opposed tree driving devices mounted on support platform 20. The driving devices are similar, and thus only one will be described in detail.

Referring to FIG. 7, a driving device 50 includes a housing 52 mounted on platform 20 for shifting toward and away from the longitudinal centerline of the apparatus, and thus toward and away from the opposing drive mechanism on the apparatus. An extensible-contractible, fluid-actuated ram 54 is operable to produce movement of the driving device toward and away from the other device. Vertically spaced sprockets 56 on shafts, such as that indicated at 58, are mounted at opposite ends of housing 52. Vertically spaced drive chains 60, 62 are trained over sprockets 56 at opposite ends of the housing and have inwardly facing, substantially parallel reaches which extend in the direction of the path for a tree through the apparatus. Secured to chains 60, 62 are elongate, substantially upright, channel 64 having flanges which project outwardly and away from the drive chains into the path for a tree. Secured between the flanges in each channel are resilient pads, such as rubber pads, 66, the outwardly facing surfaces of which are spaced a slight distance inwardly from the outer edges of the flanges of the channels. A reversible hydraulic motor 68 is drivingly connected to shaft 58 for driving chains 60, 62 and channels 64 connected thereto in either an upstream or downstream direction relative to the path for a tree through the apparatus.

A tree placed between drive mechanisms 50 is gripped by the channels 66 on extension of rams 54. Operation of motors 68 in one direction is operable to produce movement of the tree in a downstream direction through the apparatus, as illustrated in FIGS. 1 and 2. Reverse operation of motors 68 is operable to shift the tree longitudinally in the opposite direction through the apparatus.

Positioned on the upstream side of drive mechanisms 50 are a pair of opposed, laterally spaced, limb shearing means, or cutters, 70, 72. As is seen in FIGS. 1 and 2, the cutters are offset slightly from each other in an upstream/downstream direction whereby they may swing past each other on closing, as will be described below. The two cutters are substantially identical, and thus only one will be described in detail.

Referring to FIGS. 3, 4 and 7, a cutter includes a rigid, arcuate arm 74 pivotally connected as at 76 to the platform support 20, as is illustrated in the broken-away portion of FIG. 3. An extensible-contractible ram 78 connected at one of its ends to arm 74 and at its opposite end to support 20 is operable on extension to swing arm 74 from what may be considered its open position as illustrated in FIG. 3 toward what may be considered its operating, or closed, position as illustrated in FIG. 4.

An elongate, flexible, cutter chain 80 is secured at one of its ends at 81 to support 20 under the path for a tree, and at its other end is pivotally connected as at 83 to the outer end of arm 74.

Referring to FIG. 7, it will be seen that a cutter chain 80 includes a plurality of sets of side-by-side links 82 which are pivotally connected with cutter links 84, whereby the same are swingable relative to each other about axes extending parallel to the longitudinal axis of the apparatus in the path for a tree. The cutter teeth 84 have beveled sharpened edges facing in an upstream direction relative to the path. The cutter chains, due to their construction, are flexible to wrap around a tree, as illustrated in FIG. 4, but have considerable resistance to being deflected in a downstream direction.

With a tree received between cutters 70, 72, rams 78 connected thereto are extended to swing the arms 74 past each other, as illustrated in FIG. 4 with cutter chains 80 on the arms wrapping around the tree. The cutter teeth thus are in a position adjacent the trunk of the tree to shear limbs from the tree as it is drawn through the apparatus by drive means 50.

Positioned upstream in the apparatus from cutters 70, 72 is a hopper 87 having sloping sides 88 which converge on progressing downwardly. The base of the hopper is formed by a power-driven, endless conveyor 90 having lugs 92 projecting outwardly from the surface thereof. The upper surface of conveyor 90 is driven under power in the direction of movement for a tree through the apparatus, from left to right in FIGS. 1 and 2, and away from the viewer in FIG. 3.

Beneath cutters 70, 72 and fed by conveyor 90 is a chipper, or hog, 94 which receives material carried thereto by conveyor 90 and is operable to reduce the same to chips or hog material. A device which has been found to work well in such apparatus is a Fling Demolisher. An exhaust tube 96 connected to the outfeed end of hog 94 is operable to eject chips, or hog material, to a region laterally to one side of the apparatus, or into a waiting truck.

Positioned upstream from the hopper and conveyor 90 is a cradle 100 which serves to support a portion of a tree as it is operated upon by the device.

Referring to FIG. 3, at 104 is indicated generally a guillotine style cutter. This cutter includes a blade 106 secured to one end of an elongate arm 108 which is pivotally connected at 110 intermediate its ends to support platform 20. An extensible-contractible ram 112 is connected at one of its ends to the opposite end of arm 108 and at its other end to support 20. On extension of the ram, arm 108 and blade 106 are swung in the direction illustrated by the arrow 114 to swing through the path of a log as illustrated in dot-dashed outline and shear a minimum diameter top end portion from the tree.

The guillotine cutter may be manually controlled by the machine operator or it may be automatically actuated in relation to the movements of cutter arms 74. Explaining further, a switch may be installed adjacent one of arms 74 which is contacted when the arm closes to a preselected point. Since the extent to which the arms close is governed by the diameter of the tree therebetween the switch may be actuated by an arm when a portion of the tree of preselected minimum diameter is reached, with actuation of the switch operating the guillotine cutter.

Referring to FIGS. 1 and 2, downstream from driving means 50, intermediate tree supports 30, 32, 34 and at the extreme downstream end of tree support 34 are side shifter means indicated generally at 114, 116, 118.

The side shifter means are similar, and thus only one will be described in detail.

Figure 6:
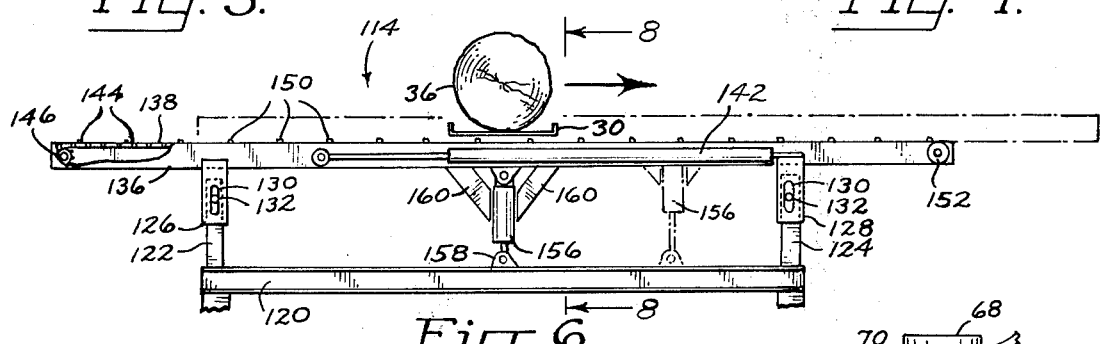
FIG. 6 is an enlarged view taken generally along the line 6—6 in FIG. 1.
Figure 8:
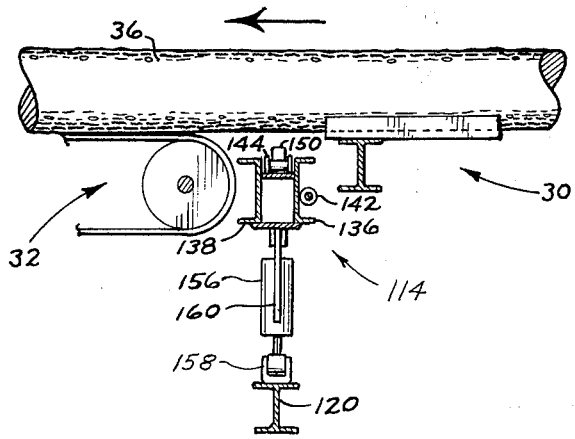
FIG. 8 is an enlarged view taken generally along the line 8—8 in FIG. 6.

Referring to FIGS. 6 and 8, side shifter 114 is illustrated. An elongate, horizontal, substantially rigid H-beam, or member, 120 is secured to support platform 20 beneath the path for a tree and extends transversely of the path.

Rigidly secured to and extending upwardly for opposite ends of beam 120 are a pair of support posts 122, 124. Elongate tubular sleeves 126, 128 having slots 130 formed therein are slidably received on posts 122, 124 respectively. Projections 132 secured to posts 122, 124 are received in slots 130 to limit the extent of vertical shifting of tubes 126, 128 relative to the posts.

A pair of elongate, parallel, horizontally disposed channels 136, 138 are secured together to form an elongate rigid beam extending parallel to and above beam 120. The beam formed of channels 136, 138 extends transversely of the path for a tree and is slidably mounted on sleeves 126, 128 for shifting laterally of the path between a generally centralized, stored, position as illustrated in solid outline in FIG. 6, and extended positions shifted laterally to either of opposite sides of the apparatus as illustrated in dot-dashed outline in FIG. 6, shifted to one side of the apparatus. The beam is shiftable a substantially equal distance to the opposite side of the apparatus if desired.

An elongate, extensible-contractible ram 142 is operatively connected at one of its ends to one of the sleeve supports, and at its other end is connected to the beam formed by channels 136, 138. Retraction of the ram shifts the beam to the right in FIG. 6, to the position illustrated in dot-dashed outline, and extension of the ram would shift the beam to the opposite side of the apparatus.

An endless, elongate, flexible conveyor member, such as a drive chain, 144 is trained over sprockets, such as that indicated at 146, adjacent opposite ends of channels 136, 138. Lugs 150 are secured to and extend outwardly from chain 144, whereby they project above channels 136, 138 where the chain extends in a reach along the upper edges of the channels. One of the sprockets over which chain 144 is trained is driven in either of opposite directions by a reversible hydraulic motor, such as that indicated at 152 in FIG. 6.

An upright, extensible-contractible, fluid-actuated ram 156 is connected at its upper end to a central region of channels 136, 138 and its lower end has a base member, or bearing pad, 158 mounted thereon. When the ram is retracted, bearing pad 158 is either spaced a short distance above beam 120 or only loosely contacts beam 120 whereby the ram may shift laterally with channels 136, 138 to either side of the centerline of the apparatus, as indicated by the ram illustrated in dot-dashed outline shifted to one side of the apparatus in FIG. 6.

A pair of diagonally disposed brace members 160 secured to channels 136, 138 engage opposite sides of ram 156 to maintain it substantially upright throughout lateral shifting of the conveyor.

Ram 156 when extended engages beam 120 and is operable to raise the conveyor from a lowered position, as illustrated in solid outline in FIG. 6 below the tree-supporting surfaces of tree supports 30, 32, to a raised position as illustrated in dot-dashed outline above such tree-supporting surface to lift a tree therefrom.

In operation, ram 142 is actuated to shift the side shifting conveyor laterally of the apparatus to a desired side thereof to which trees are to be deposited. As the conveyor is shifted to the side, ram 156 moves therewith toward one side of the apparatus as illustrated in dot-dashed outline. When a tree is in proper position on the tree supports to be removed from the apparatus, ram 156 is extended to raise the conveyor above the support surfaces of the tree supports and motor 152 is operated to drive chain 144 in the desired direction to carry a tree laterally of the apparatus toward one side thereof and to deposit it either on a waiting log bunk or on a stack adjacent one side of the apparatus. With ram 156 shifting laterally of the apparatus with the conveyor it is always maintained in a position generally centrally of the conveyor for more stable support of the conveyor in its raised position. Also, it should be recognized that slots 130 cooperate with projections 132 on the support posts and sleeves to limit the extent of lowering and raising of the side shifting conveyor to desired positions.

As has been mentioned previously, support platform sections 20, 28 are swingable relative to each other about a pivot connection 30. This interconnection and the mechanism for folding platform section 28 over relative to platform section 20 are best illustrated in FIG. 5. As is seen, a pair of gusset, or brace, plates 164, 166 are secured to and project upwardly from platform sections 20, 28, respectively. Pivot pin 30 extends through the upper ends of plates 164, 166 to pivotally interconnect the same. An elongate, free link 170 is swingably mounted on pin 30 for swinging relative to plates 164, 166. An elongate, extensible-contractible, fluid-actuated ram 174 is pivotally connected at one of its ends to support platform 20 and another elongate, extensible-contractible, fluid-actuated ram 176 is connected at one of its ends to support platform 28. The opposite set of ends of rams 174, 176 are pivotally connected at 178 to link 170 in a region spaced from pivot pin 30.

With the rams extended as illustrated in FIG. 5, support platform section 28 is folded back and over support platform 20 as illustrated in dot-dashed outline in FIG. 2. On retraction of rams 174, 176 platform section 28 is swung outwardly about the pivot axis provided by pivot pins 30 to its extended operating position as illustrated in FIGS. 1 and 2, extending substantially axially forwardly from platfrom section 20.

Describing now the operation of the apparatus, crane 44 is operable to grip a felled tree and lay it in the apparatus between opposed drive means 50 and opposed shearing means 70, 72, with the butt end of the tree facing in a downstream direction. Portions of the tree extending in an upstream direction, or rearwardly from shearing means 70, 72, extend over hopper 87 which feeds the chipper means, and rests in cradle 100.

Extension of rams 54 on the driving means shifts the driving means against opposite sides of the tree with the flanges of channels 64 biting into opposite sides of the tree. The resilient pads 66 limit the extent of such penetration to prevent excessive damage to the trunk of the tree. Operation of motors 68 on the drive means moves the drive chains and channels in a downstream direction to carry the tree supported on support 30 along the path.

Extension of rams connected to arms 74 of the shearing means causes them to swing inwardly over the tree as illustrated in FIG. 4 with the cutter chains thereon wrapping around the tree. As the tree is carried through the apparatus by operation of the driving means, the cutter teeth 84 on the cutter chain shear limbs therefrom. Trees generally may be carried through the apparatus by drive means 50 at speeds of about 400 feet per minute. With such speeds the inertia of the moving tree aids in producing shearing of the limbs therefrom.

It should be understood (although it is not specifically shown in the drawings) that the fluid pressure systems supplying rams 54, which crowd the drive means against the sides of a tree, and rams 78, which swing arms 74 of the cutters over a tree, includes accumulators. Such accumulators maintain desired preselected fluid pressures in rams 54, 74, whereby they grip a tree with substantially constant, preselected force as the tree diminishes in size as it passes the drive means and cutters.

Limbs sheared from the tree drop into the region between the hopper walls 88 and onto conveyor 90. They then are conveyed into chipper, or hog, 94 in which they are reduced to chips. These chips then are blown outwardly through tube 96 to be deposited either on a waste pile or into a truck for transportation.

Should limbs become clogged in the region of the cutter chains, it is a simple matter to reverse the operation of the driving means by reversing motor 68 thereon to back the tree in an upstream direction through the apparatus and drop such sheared limbs onto conveyor 90 for carrying into the chipper.

Since a tree generally tapers to a reduced diameter near its top, when the minimum diameter desired for the trimmed tree has reached the area of shearing means 70, 72, a control for guillotine cutter 104 may be either automatically or manually operated to produce extension of ram 112, swinging the cutter blade downwardly to cut off the topmost end of the tree and drop it onto conveyor 90. The conveyor then carries this topmost end of the tree into the chipper and it also is reduced to chips.

Throughout this operation the delimbed tree is carried in a downstream direction over supports 30, 32, 34. If it is desired to cut the tree into shorter sections a power-operated saw 180 mounted on the apparatus is operable to move across the path for the tree and cut it into shorter sections as desired.

When a delimbed tree (whether it be a severed shorter section of the full length of the tree) is conveyed past driving means 50 it is in a position where it may be side shifted and deposited in a region to one side of the apparatus.

Prior to such operation, side shifting conveyors 114, 116, 118 are shifted laterally of the apparatus by operation of their associated rams 142 to the side of the apparatus to which it is desired to deposit the trees. When a tree is in position to be side shifted, rams 156 on the side shifting conveyors are extended to lift the conveyors above the support surfaces of the tree supports. Operation of motors 152 on the side shifting conveyors is operable to carry the tree laterally of the apparatus and deposit it to a desired side of the apparatus.

When it is desired to move the apparatus it is a simple matter to actuate rams 174, 176 to fold platform section 28 back and over platform section 20 to shorten the apparatus for transport. It then may be merely connected to a tractor vehicle and towed to another site.

The apparatus, therefore, is capable not only of delimbing felled trees with great speed and efficiency, but also reduces the removed limbs and tops to chips which are blown into a waiting truck, or pile. The apparatus also can stack the delimbed trees to a desired side of the apparatus. Manual delimbing, and limb piling, as well as opening burning of the limbs, thus are eliminated.

It should be evident also that such apparatus could be made self propelled with its own motive power and steering mechanism. However, it is illustrated here in a manner to be towed by another vehicle.

While a preferred embodiment of the invention has been described herein, it should be apparent to those skilled in the art that variations and modifications are possible without departing from the spirit of the invention.

I claim:

1. Apparatus for delimbing felled trees comprising elongate support means for supporting a tree and providing a path along which the tree may be carried longitudinally of the path,
   powered driving means for moving a tree under power longitudinally along said path,
   shearing means for shearing limbs from such tree as it is carried under power along said path,
   chipper means beneath said shearing means for receiving limbs sheared from a tree and reducing the same to chips, and
   side shifter means downstream in said path from said shearing means operable to receive a delimbed tree and shift it laterally of said path to deposit the same in a region disposed laterally of said support means.

2. The apparatus of claim 1, wherein said driving means comprises an endless flexible member having tree engaging elements thereon, training means about which said member extends with an elongate reach of said member extending longitudinally of said apparatus, and powered means operatively connected to said reach for driving the same in the direction of said path.

3. The apparatus of claim 2, wherein a tree engaging element comprises a member attached to said reach and having a flange thereon projecting outwardly into said path to engage a tree, and resilient limiting means on said member adjacent said flange for limiting the extent of penetration of said flange into a tree.

4. The apparatus of claim 2, wherein said driving means is mounted for shifting toward and away from said path, and which further comprises crowding means for urging said reach of the flexible member and the elements thereon toward said path.

5. The apparatus of claim 2, wherein said driving means further comprises a second flexible, endless member spaced from and paralleling said first-mentioned member, and said tree engaging elements comprise elongate substantially rigid members having projecting flanges thereon, said members extending between and being connected at spaced points to said flexible members with the flanges thereon projecting into said path.

6. The apparatus of claim 1, wherein said shearing means comprises a pair of opposed arms pivotally connected to said support means at opposite sides of said path and spaced-apart longitudinally of said path, an elongate wrap-around cutter associated with each of said arms, a cutter including a plurality of cutter teeth pivotally interconnected for swinging relative to each other about axes extending parallel to said path with cutting edges on said teeth facing in an upstream direction relative to said path and being secured at one of its ends to said support means and at its other end to one of said arms in a region spaced outwardly from said support means, and powered means operatively connected to said arms to swing the same under power inwardly of said path to wrap said cutters over a tree carried along said path.

7. The apparatus of claim 6, wherein an arm is arcuate and is positioned with its concave side facing said path.

8. The apparatus of claim 1, which further comprises cut off means adjacent said shearing means, said cut off means being operable to remove an end portion of a tree from the remaining portions of the tree to permit dropping said end portions into said chipper means.

9. The apparatus of claim 8, wherein said cut off means comprises a power-actuated guillotine blade mounted for swinging under power through said path.

10. The apparatus of claim 1, wherein said support means comprises an elongate tree support having an upper tree supporting surface extending longitudinally of said apparatus, and said side shifter means comprises a pair of elongate conveyors spaced apart longitudinally of said apparatus and extending transversely of said path, said conveyors being mounted for vertical shifting between lowered positions below the tree supporting surface of said support and raised positions above said surface to lift a tree from said surface, and power-actuated means for shifting said conveyors between their lowered and raised positions.

11. The apparatus of claim 10, wherein said conveyors further comprise means for shifting a tree lifted from said tree supporting surface laterally of said path to deposit the same adjacent said apparatus.

12. The apparatus of claim 10, wherein one of the conveyors in said pair is shiftable between a stored position disposed substantially centrally relative to the longitudinal centerline of said apparatus and an operating position shifted laterally of said path with an outer end thereof projecting outwardly beyond a side of said support means.

13. The apparatus of claim 12, which further comprises reversible, power-actuated means for shifting said one conveyor between said stored and operating positions.

14. The apparatus of claim 10, wherein one of said conveyors in said pair comprises an elongate, flexible conveyor member having a reach extending laterally of and underlying said path for a tree and having lugs secured thereto and projecting upwardly into said path when said conveyor is in its raised position, and which further comprises drive means for driving said conveyor member transversely of said path.

15. The apparatus of claim 12, wherein said one conveyor comprises an elongate substantially rigid support beam mounted for shifting vertically and laterally of said apparatus and said power-actuated means for shifting said conveyor between a raised and lowered position comprises an upright extensible-contractible ram connected adjacent its upper end to said beam and shiftable laterally therewith, and a cooperating base member on said support means along which the lower end of said ram moves during lateral shifting and against which the ram bears on extension to produce raising of said conveyor.

16. The apparatus of claim 15, which further comprises bracing means operable to maintain said ram in a sustantially upright position.

17. The apparatus of claim 1, wherein said support means comprises an elongate platform having forward and rear section pivotally connected for swinging relative to each other about a substantially horizontal pivot axis and operator means for folding one of said sections over into a supported position resting atop the other of said sections.

18. The apparatus of claim 17, wherein said operator means comprises an elongate link pivotally connected adjacent one of its ends for swinging about said pivot axis relative to said forward and rear sections, a first extensible-contractible ram pivotally connected at one of its ends to said forward section, and a second extensible-contractible ram pivotally connected at one of its ends to said rear section, said first and second rams being pivotally connected at their other set of ends to said link in a region spaced from said pivot axis.

19. Apparatus for delimbing felled trees comprising
elongate support means for supporting a tree and providing a path along which the tree may be carried longitudinally through the apparatus,
powered driving means for moving a tree under power longitudinally along said path including an endless flexible member, training means about which said member extends with an elongate reach of the member extending longitudinally of said apparatus, flanged tree-engaging members attached to said reach with flanges on the members projecting outwardly into the path for a tree to engage such tree, resilient limiting means mounted on said members for limiting the extent of penetration of said flange into a tree, and powered means operatively connected to said reach for driving the same in the direction of said path,
shearing means for shearing limbs from a tree as it is carried under power along said path, and
chipper means beneath said shearing means for receiving limbs sheared from a tree and reducing the same to chips.

20. The apparatus of claim 19, wherein said driving means is mounted for shifting toward and away from said path and which further comprises crowding means for urging said reach of the flexible member and the elements thereon toward the path for a tree.

21. Apparatus for delimbing felled trees comprising
elongate support means for supporting a tree and providing a path along which the tree may be carried longitudinally through the apparatus,
driving means for moving a tree under power longitudinally along said path,
shearing means for shearing limbs from a tree as it is carried under power along said path including a pair of opposed arms pivotally connected to said support means at opposite sides of said path and spaced apart longitudinally of said path, an elongate wrap-around cutter associated with each of said arms, a cutter including a plurality of cutter teeth pivotally interconnected for swinging relative to each other about axes extending substantially parallel to said path, with cutting edges on said teeth facing in an upstream direction relative to said path, each cutter being secured at one of its ends to said support means and at its other end to one of said arms in a region spaced outwardly from said support means, and powered means operatively connected to said arms for swinging the same under power inwardly of said path to wrap said cutters about a tree carried along said path, and chipper means beneath said shearing means for receiving limbs sheared from a tree and reducing the same to chips.

22. Apparatus for delimbing felled trees comprising an elongate tree support having an upper tree supporting surface extending longitudinally of said apparatus for supporting a tree and providing a path along which it may be carried longitudinally through the apparatus, driving means for moving a tree under power longitudinally along said path, shearing means for shearing limbs from a tree as it is carried under power along said path, and side shifter means downstream in said path from said shearing mean operable to receive a delimbed tree and shift it laterally of said path to deposit the same in a region spaced laterally of said support means, said side shifter means including a pair of elongate conveyors spaced apart longitudinally of said apparatus and extending transversely of said path, said conveyors being mounted for vertical shifting between lowered positions below the tree-supporting surface of said support and raised positions above said surface to lift a tree from said surface, and power-actuated means for shifting said conveyors between said lowered and raised positions and means for shifting a tree lifted from said tree supporting surface laterally of said path to deposit the same adjacent said apparatus.

23. The apparatus of claim 22, wherein one of said conveyors in said pair is shiftable between a stored position disposed substantially centrally of said apparatus and an operating position shifted laterally of said path with an outer end thereof projecting outwardly beyond a side of said support means.

24. The apparatus of claim 23, wherein said one conveyor comprises an elongate, substantially rigid support beam mounted for shifting vertically and laterally of said apparatus and said power-actuated means for shifting said conveyor between a raised and lowered position comprises an upright, extensible-contractible ram connected adjacent its upper end to said beam and shiftable laterally therewith, and a cooperating base member on said support means along which the lower end of said ram moves during lateral shifting and against which the ram bears on extension to produce raising of said conveyor.

25. The apparatus of claim 24, which further comprises bracing means operable to maintain said ram in a substantially upright position.

26. Apparatus for delimbing felled trees comprising elongate support means for supporting a tree and providing a path along which the tree may be carried longitudinally through the apparatus, said support means including an elongate platform having forward and rear sections pivotally connected for swinging relative to each other about a substantially horizontal pivot axis and operator means for swinging one of said sections about said pivot axis between a supported position resting atop the other said section and an operating position substantially axially aligned with the other of said sections, powered driving means for moving a tree under power longitudinally along said path, shearing means for shearing limbs from said tree as it is carried under power along said path, chipper means beneath said shearing means for receiving limbs from a tree and reducing the same to chips, and side shifter means downstream in said path from said shearing means operable to receive a delimbed tree and shift it laterally of said path to deposit the same in a region laterally of said support means.

27. The apparatus of claim 26, wherein said operator means comprises an elongate link pivotally connected adjacent one of its ends for swinging about said pivot axis relative to said forward and rear sections, a first extensible-contractible ram pivotally connected at one of its ends to said forward section, and a second extensible-contractible ram pivotally connected at one of its ends to said rear section, said first and second rams being pivotally connected at their other set of ends to said link in a region spaced from said pivot axis.

* * * * *